United States Patent
Shore et al.

(10) Patent No.: US 7,635,534 B2
(45) Date of Patent: Dec. 22, 2009

(54) SIMPLIFIED PROCESS FOR LEACHING PRECIOUS METALS FROM FUEL CELL MEMBRANE ELECTRODE ASSEMBLIES

(75) Inventors: Lawrence Shore, Edison, NJ (US); Ramail Matlin, Berkeley Heights, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 103 days.

(21) Appl. No.: 11/844,723

(22) Filed: Aug. 24, 2007

(65) Prior Publication Data

US 2009/0049954 A1 Feb. 26, 2009

(51) Int. Cl.
*H01M 8/00* (2006.01)
*C22B 3/06* (2006.01)
*C22B 3/10* (2006.01)
*C22B 11/04* (2006.01)

(52) U.S. Cl. .............................. 429/45; 75/744; 423/22
(58) Field of Classification Search ................... 75/710, 75/711, 715, 743, 744; 429/49; 423/22; 210/649–651; *H01M 6/50; C22B 11/00; C01G 55/00*
See application file for complete search history.

(56) References Cited

U.S. PATENT DOCUMENTS

| | | | | |
|---|---|---|---|---|
| 4,073,443 | A * | 2/1978 | Danioni ........................ | 241/65 |
| 4,406,411 | A * | 9/1983 | Gall et al. ................... | 428/577 |
| 5,993,635 | A * | 11/1999 | Hourn et al. ................. | 205/568 |
| 6,455,018 | B1 | 9/2002 | Cuif | |
| 2002/0044899 | A1 * | 4/2002 | Marsden et al. ............... | 423/28 |
| 2003/0075021 | A1 * | 4/2003 | Young et al. .................. | 75/743 |
| 2004/0028585 | A1 * | 2/2004 | Cardarelli et al. ............. | 423/66 |
| 2005/0211630 | A1 | 9/2005 | Grot et al. | |
| 2006/0147791 | A1 | 7/2006 | Debe et al. | |
| 2006/0237034 | A1 | 10/2006 | Shore et al. | |

FOREIGN PATENT DOCUMENTS

| | | | |
|---|---|---|---|
| WO | WO03031664 A | | 4/2003 |
| WO | WO2006-024507 A | | 3/2006 |
| WO | WO 2006/073840 | * | 7/2006 |
| ZA | 880823 | * | 2/1988 |

OTHER PUBLICATIONS

Lawrence Shore: "Platinum Group Metal Recycling Technology Development"; Annual Merit Review & Peer Evaluation, May 18, 2007, XP002502883, Washington DC.
L. Shore: "Platinum Group Metal Recycling Technology Development"; Doe Hydrogen Program: Annual Progress Report, Nov. 2007, pp. 1027 to 1030, XP002502884, Washington DC.
L. Shore: "Precious Metal Recovery from Fuel Cell Mea's"; Alche-Conference Proceedings, Mar. 2004, XP009108231, New Orleans, the whole document.

* cited by examiner

*Primary Examiner*—Jerry Lorengo
*Assistant Examiner*—Jared Wood
(74) *Attorney, Agent, or Firm*—Bernard Lau (57) ABSTRACT

The membrane electrode assemblies of fuel cells are recycled to recover the catalyst precious metals from the assemblies. The assemblies are cryogenically embrittled and pulverized to form a powder. The pulverized assemblies are then mixed with a surfactant to form a paste which is contacted with an acid solution to leach precious metals from the pulverized membranes.

27 Claims, 7 Drawing Sheets

SIMPLIFIED PROCESS FOR LEACHING PRECIOUS METALS FROM FUEL CELL MEMBRANE ELECTRODE ASSEMBLIES

GOVERNMENT INTERESTS

This invention was made with Government support under Agreement DE-FC36-03GO1314 awarded by the Department of Energy. The Government has certain rights in this invention.

TECHNICAL FIELD

Disclosed are methods to recover precious metal from fuel cell membrane electrode assemblies.

BACKGROUND

Fuels cells are widely used devices design to generate electric power. Principle uses of fuel cells include automobiles and power generation in remote areas. Numerous high cost materials are employed in the construction of fuel cells including large amounts of platinum metal and specialized polymer electrolyte membranes. Fuel cells have a limited life span due to wear and tear on the components including changes to the performance of the polymer electrolyte membrane that occurs over time. Recovery of platinum from used fuel cells represents a large value that would otherwise go to waste. Efficient methods of recycling reduce the cost of employing fuel cells allowing for more widespread use.

Fuel cells convert a fuel and an oxidizing agent into electricity, heat, and water. Fuel cells are composed of a polymer electrolyte membrane sandwiched between an anode and a cathode, and the polymer electrolyte membrane also serves to keep the fuel and oxidizing agent locally separated. The polymer electrolyte membrane is selectively permeable and non-conductive, for example, the polymer electrolyte membrane is permeable only to hydrogen ions in a hydrogen/oxygen fuel cell. The reactions at the cathode and anode may be summarized as follows:

$$H_2 \rightarrow 2H^+ + 2e^- (\text{Anode}) \rightarrow \tfrac{1}{2}O_2 + 2e^- \rightarrow H_2O(\text{Cathode}) \qquad (1)$$

The polymer electrolyte membrane, anode, and cathode are further sandwiched between two gas diffusion layers forming five layers in total, referred to as a membrane electrode assembly. The gas diffusion layers are formed from porous, fibrous carbon fibers allowing for gaseous reactants and products to diffuse toward or away from the anode and cathode. The anode and cathode are formed from platinum-containing electrode catalyst layers that are deposited on the surface of either the gas diffusion layers or the polymer electrolyte membrane. Electrode catalyst layers deposited on the gas diffusion layer are known as gas diffusion electrodes, and those having the electrode catalyst layers deposited on the polymer electrolyte membrane are known as catalyst coated membranes. The terms gas diffusion electrode assembly and catalyst coated membrane assembly, respectively, refer to membrane electrode assemblies having the respective type of electrode catalyst layers.

The electrode catalyst layers typically contain precious metals as active catalytic components in addition to other components including conductive supporting material. For example, 0.5-4 mg/cm$^2$ of platinum can be applied to the electrodes in the form of an ink or using complex chemical procedures. Platinum is a significant cost in the fabrication of a fuel cell.

The bulk of the membrane electrode assembly is carbon-based; therefore, a standard method to recycle precious metals, including platinum, involves a combustion step to remove carbon material. However, membrane electrode assemblies have high fluorine content due to polytetrafluoroethylene (PTFE) impregnated on the carbon fibers and from common polymer electrolyte membrane materials, such as Nafion® (DuPont Co., Wilmington, Del.), which results in a large, undesirable discharge of HF upon combustion. Removal of HF gas involves scrubbing and dedicated equipment that can withstand the corrosive nature of HF gas. Isolating the combustion from existing infrastructure is recommended to localize maintenance needs caused by the effects of HF gas.

Alternate methods of fuel-cell membrane electrode assembly recycling can withstand improvement when attempting to process both catalyst coated membrane assemblies and gas diffusion electrode assemblies. Fuel cell recyclers cannot easily determine if a membrane electrode assembly is a catalyst coated membrane assembly or a gas diffusion electrode assembly unit, which can potentially result in a loss of precious metal recovery if the wrong process is used. Known methods, including combustion, also result in loss of ruthenium, often present as a catalyst in addition to platinum, and polymer electrolyte membrane material that can potentially be economically recycled in a downstream process after precious metal recovery.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides for a method to recover precious metals from fuel cells. Specifically, precious metals can be recovered from both catalyst coated membrane assemblies and gas diffusion electrode assemblies without any need to determine the type of membrane electrode assemblies present or without sorting of the assemblies before recovery.

One aspect of the invention relates to methods for recovering precious metal from fuel cells by super-cooling membrane electrode assemblies to embrittle the membrane electrode assemblies and pulverizing the embrittled membrane electrode assemblies. Precious metal is then removed from the pulverized membrane electrode assemblies by contacting an acid solution containing an acid and an oxidizing agent to form an extract. Precious metal can be recovered from the extract using known electroplating and/or chemical reduction techniques.

Another aspect of the invention relates to methods for recycling precious metals from fuel cells where the methods are environmentally friendly and do not produce HF gas. Consequently, the cost of fabricating fuel cells can be reduced by providing efficient methods to recycle precious metals from fuel cells that have reached the end of their useful lives.

Yet another aspect of the invention relates to assaying the entire precious metal value of a lot of catalyst coated membrane assemblies and/or gas diffusion electrode assemblies. The precious metal value of a residue of the pulverized electrode membrane assembly can be assayed after being leached at least one time to assist in calculating mass balance.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

The subject invention provides a system and consolidated process to recover and/or recycle one or more precious metals from both catalyst coated membrane assemblies and gas diffusion electrode assemblies without any need to determine the type of membrane electrode assemblies present at any stage of the process. The process also allows for the opportunity to recover polymer from the polymer electrolyte membrane and/or ruthenium from the electrode catalyst layers as a downstream operation. While a functional membrane electrode assembly typically contains a number of layers including a polymer electrolyte membrane layer, two gas diffusion layers, and two electrode catalyst layers, the term membrane electrode assembly used herein refers to a polymer electrolyte membrane with at least one electrode catalyst layer adhered and/or contacted to either side of a polymer electrolyte membrane. Membrane electrode assembly can alternatively refer to a polymer electrolyte membrane layer with at least one gas diffusion layer and one electrode catalyst layer. The terms catalyst coated membrane assembly and gas diffusion electrode assembly refer to membrane electrode assemblies having catalyst coated membrane electrode catalyst layers and gas diffusion electrode catalyst layers, respectively.

One available alternative to combustion recycling is delaminating of the electrode catalyst layers followed by filtration, described in U.S. patent application Ser. No. 11/110,406 filed Apr. 20, 2005 which is incorporated herein by reference. The carbon fiber gas diffusion layers are removed via manual or solvent delaminating in order access the electrode catalyst layers containing the precious metals. However, over the life of a fuel-cell, a portion of the precious metals migrates from the electrode catalyst layers into the polymer electrolyte membrane layers and/or adheres to the gas diffusion layer. Migration of the precious metals results in the formation of nanocrystallites (less than about 200 nm) in the membrane. The nanocrystallites containing precious metals are unrecoverable since they are lost in solvent delamination as they are finer than the filter openings. Removal of the gas diffusion layer results in immediate loss of a portion of the precious metals originally present in the fuel cell that is otherwise available for recycling. When catalyst coated membrane assemblies are solvent delaminated, the gas diffusion layers are removed, the electrode catalyst layers mobilize into the solvent, and the polymer electrolyte membranes emulsify.

Precious metals are then recoverable by filtration acts since the precious metals in the mobilized electrode catalyst layer are not dissolved in the solvent, being present in fine and coarse particles. However, solvent delaminating is not as effective with gas diffusion electrode assemblies since the laminated gas diffusion electrode assemblies only partially separate. The polymer electrolyte membrane remains intact and the electrode catalyst layers stay firmly attached to the gas diffusion layers. Therefore, precious metals from gas diffusion electrode assemblies are not recoverable via delaminating and filtration.

Another alternative to combustion recycling is heat-assisted acid leaching from membrane electrode assemblies, which is performed by immersing intact membrane electrode assemblies in hot aqua regia and heating. However, the yield of precious metal recovery is not reproducible due to the resultant inconsistent penetration of the leaching acid into the electrode catalyst layers of the intact membrane electrode assemblies. Higher consistency may be obtained by delaminating the gas diffusion layers; however, as discussed above, solvent delaminating the gas diffusion layers from gas diffusion electrode assemblies is ineffective. And manual delamination is labor intensive and costly; therefore, manual delamination is not preferred.

The process disclosed herein bypasses the need to delaminate membrane electrode assemblies by pulverizing the membrane electrode assemblies into a homogenous powder prior to acid leaching. Grinding into a powder allows for acid to reach the precious metal contained in the electrode catalyst layers regardless of whether catalyst coated membrane assemblies or gas diffusion electrode assemblies are being recycled. Both types of membrane electrode assemblies (catalyst coated membrane assemblies or gas diffusion electrode assemblies) can be processed together or separately. The process provides for precious metal recovery while allowing an opportunity for recovery of 1) polymer from the polymer electrolyte membranes and 2) ruthenium from the electrode catalyst layers during downstream operations.

Figure 1:
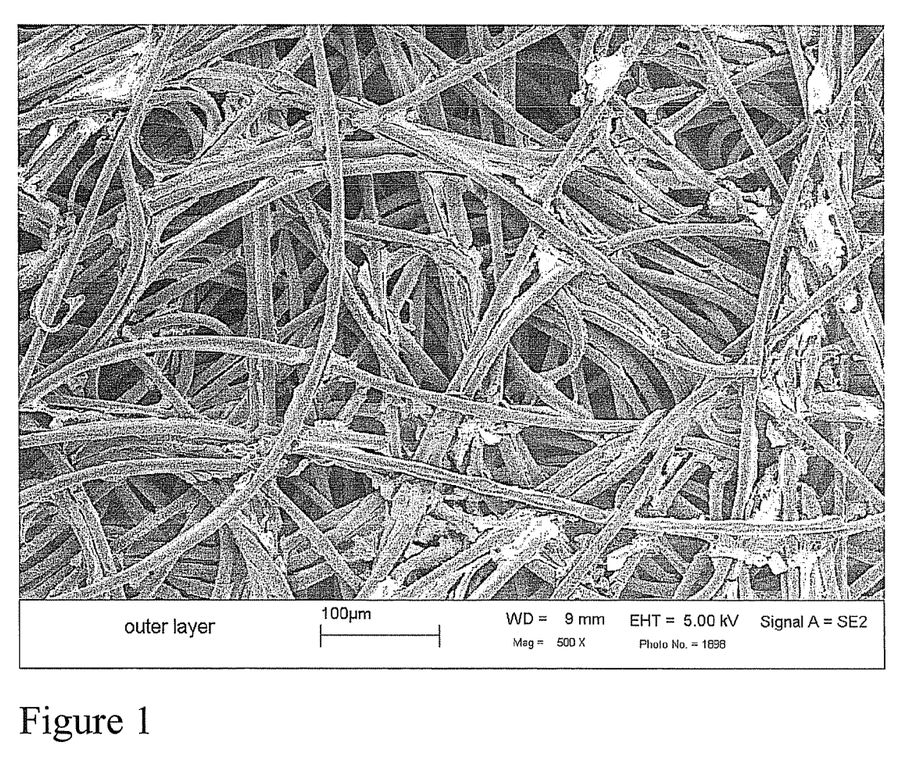
FIG. 1 displays an electron micrograph of an intact gas diffusion layer at 500× magnification.

Normally, a fibrous and polymeric material does not mill well. However, both the carbon fibers of the gas diffusion layers and polymer electrolyte membrane materials can be dismembered and significantly reduced in size using an impact mill after the membrane electrode assemblies are suitably cooled to a cryo-temperature sufficient to embrittle the membrane electrode assemblies. Referring to FIG. 1, the carbon fibers (spaghetti-like material) of an intact gas diffusion layer from a catalyst coated membrane assembly are depicted in a 500× magnification electron micrograph. In addition to the carbon fibers, micro-PTFE is impregnated on the carbon fibers and is observed as lighter colored clumps adhering to the carbon fibers.

A further advantage of the methods disclosed herein is the ability to assay the entire precious metal value of a lot of used catalyst coated membrane assemblies and/or used gas diffusion electrode assemblies without extracting precious metals from the entire lot. Since the pulverization of the intact membrane electrode assemblies results in a homogeneous powder, precious metals can be extracted from a small portion of the entire lot and measured through standard analytical techniques. The precious metal value of the entire homogenized lot can be calculated using routine mathematics once the precious metal value of a portion of the homogenized lot is known. Further, the ability to assay a portion of the homogenized lot or mixture also assists in mass balance calculations in determining the yield of precious metal recovered.

Figure 2:
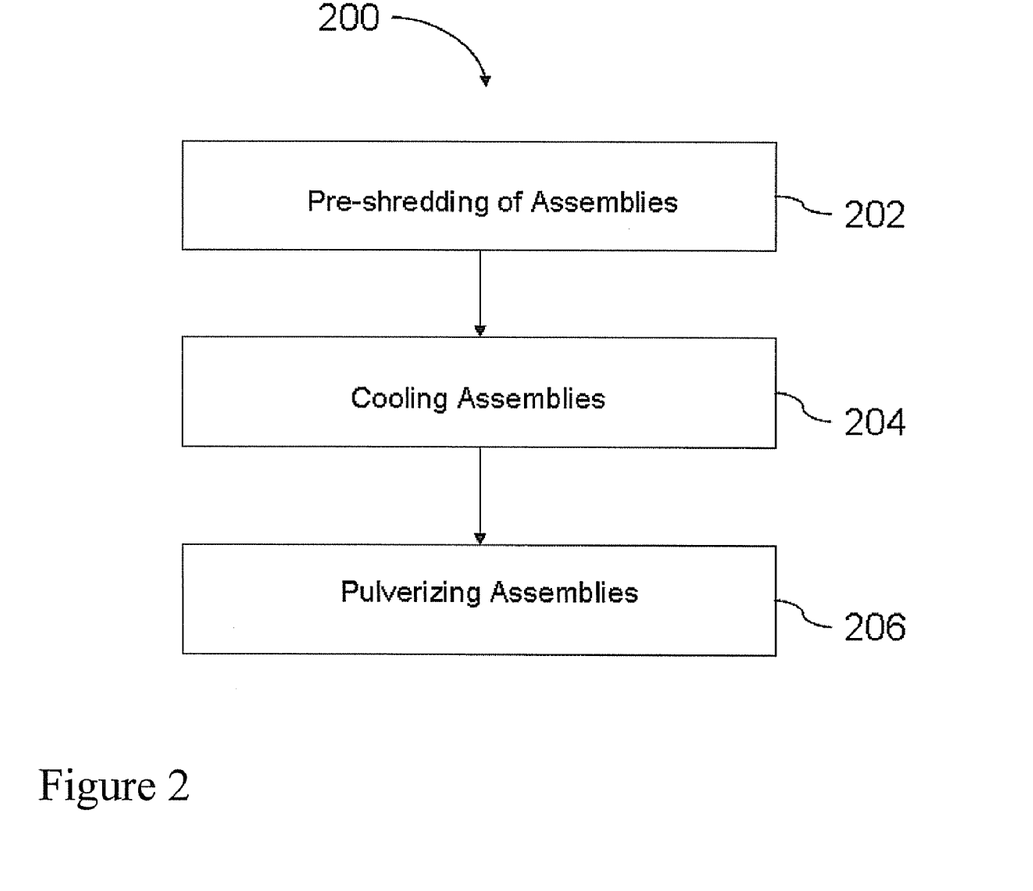
FIG. 2 illustrates a flow chart for the pulverization of membrane electrode assemblies in accordance with an aspect of the invention.

Referring to FIG. 2, a flow chart of a method 200 for pulverizing membrane electrode assemblies in one aspect of the invention is shown. In act 202, sheets of membrane electrode assemblies are optionally pre-shredded in order to assist in homogenization. In act 204, the shredded membrane electrode assemblies are cooled to a cryo-temperature for a suitable period of time, such as about 10 minutes.

The pulverization in act 206 can be performed in a batch-wise fashion. The pre-cooled membrane electrode assemblies are pulverized in act 206, for example, in an impact mill. The membrane electrode assemblies can optionally be re-cooled and the pulverization is repeated as many times as are necessary to achieve sufficient homogeneity. Suitable impact mills include, for example in small scale operations, the SPEX® 6850 (SPEX CertiPrep, Metuchen, N.J.) and the like.

In an alternative embodiment, the pulverization can be accomplished by continually grinding while maintaining a cryo-temperature. In one embodiment, act 204 is performed by placing membrane electrode assemblies in a feeder with the capability to maintain a cryo-temperature by continually cooling the membrane electrode assemblies, such as contacting with a cryo-liquid such as liquid nitrogen. Suitable feeders include Cryo-Grind™ feeders (Air Products, Allentown, Pa.) and cryogenic feeders supplied by Pulva Corporation (Saxonburg, Pa.). The cooled and embrittled membrane electrode assemblies then exit the cryogenic feeder directly into a high-capacity impact mill capable of forming a homogenized powder in one pass through the mill. Suitable impact mills include the Mikro Bantam™ mill (Hosokawa Micron Crop., Osaka, Japan) and the like. In another embodiment, membrane electrode assemblies are pre-cooled to embrittlement and placed directly into a high-capacity impact mill.

A cryo-temperature is a temperature sufficient to embrittle membrane electrode assemblies. In one embodiment, a cryo-temperature is a temperature of about −75° C. or less. In another embodiment, a cryo-temperature is a temperature of about −125° C. or less. In yet another embodiment, a cryo-temperature is a temperature of about −196° C. or less. Cooling may be effected by contact with cryogenic cooling systems and may involve the use of cryo-materials including liquid nitrogen, dry ice, and the like.

In one embodiment, the density of pulverized membrane electrode assemblies is from about 25 to about 2500 kg m$^{-3}$. In another embodiment, the density of pulverized membrane electrode assemblies is from about 50 to about 1500 kg m$^{-3}$. In yet embodiment, the density of pulverized membrane electrode assemblies is from about 100 to about 1000 kg m$^{-3}$.

The pulverized membrane electrode assemblies are crushed to a sufficiently small size to facilitate subsequent extraction. In one embodiment, the pulverized membrane electrode assemblies have at least about 90% by weight of the particles with an average particle size of about 250 microns or less. In another embodiment, the pulverized membrane electrode assemblies have at least about 90% by weight of the particles with an average particle size of about 100 microns or less. In another embodiment, the pulverized membrane electrode assemblies have at least about 90% by weight of the particles with an average particle size of about 50 microns or less.

Figure 3:
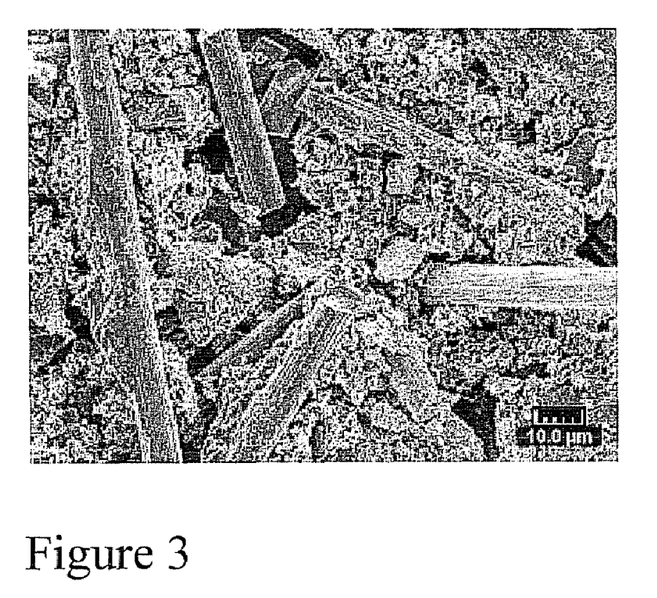
FIG. 3 displays an electron micrograph of pulverized catalyst coated membrane assembly membrane electrode assemblies at 1000× magnification in accordance with an aspect of the invention.
Figure 4:
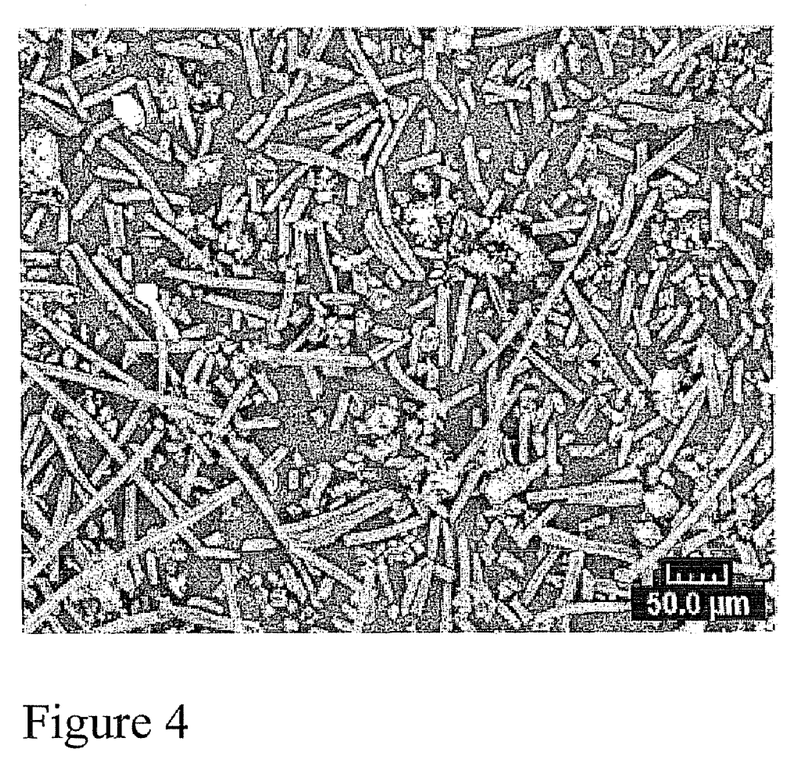
FIG. 4 displays an electron micrograph of pulverized gas diffusion electrode assembly membrane electrode assemblies at 200× magnification in accordance with another aspect of the invention.

Referring to FIG. 3, an electron micrograph at 1000× magnification of pulverized and homogenized catalyst coated membrane assemblies is shown. Referring to FIG. 4, an electron micrograph at 200× magnification of pulverized and homogenized gas diffusion electrode assemblies is shown. The carbon fibers from the gas diffusion layers can be seen as broken into short segments and interdispersed with other materials from different layers of the membrane electrode assemblies. Acid solutions can reach all the precious metal-containing components of the pulverized membrane electrode assemblies with equal accessibility for both catalyst coated membrane assemblies and gas diffusion electrode assemblies.

Figure 5:
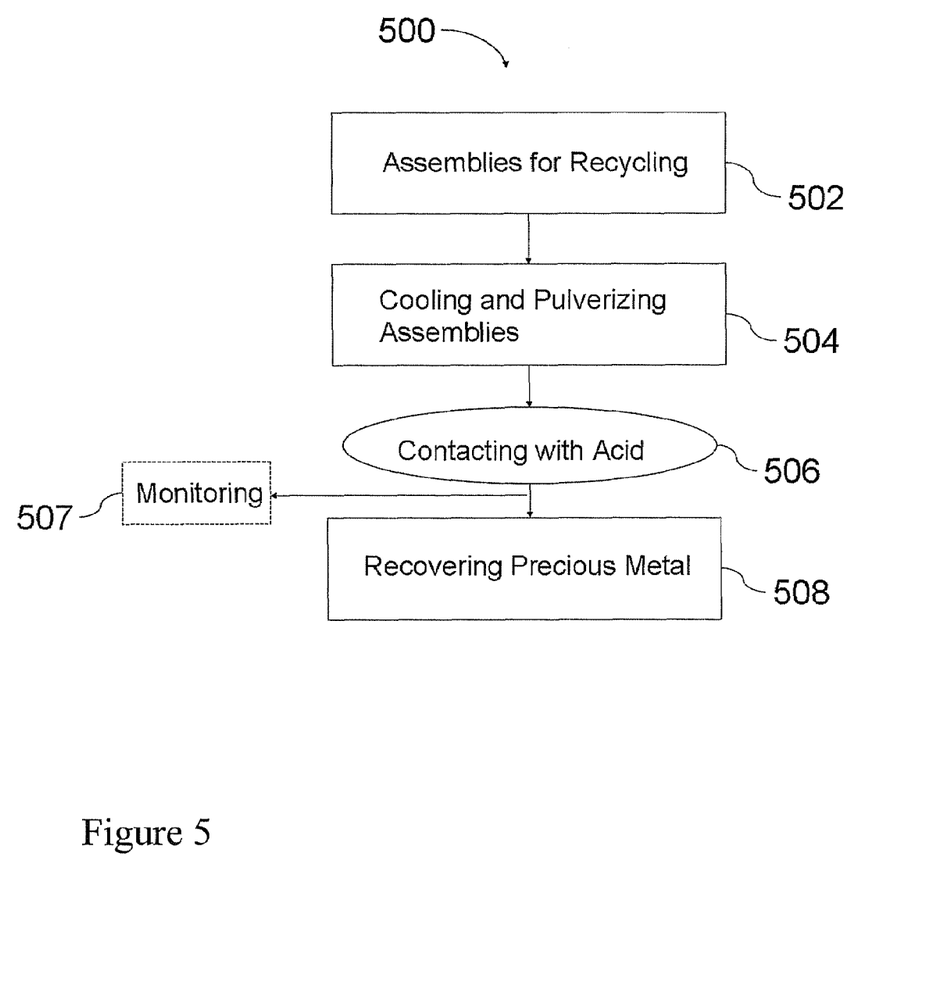
FIG. 5 illustrates a flow chart for leaching precious metal from membrane electrode assemblies in accordance with an aspect of the invention.

Referring to FIG. 5, a flow chart of a method 500 for recovery of precious metals from homogenized membrane electrode assemblies is shown in accordance with the invention. In act 502, a recycler recovers a mixture of worn out or spent catalyst coated membrane assemblies and/or gas diffusion electrode assemblies from used fuel cells. There is no need to differentiate catalyst coated membrane assemblies and gas diffusion electrode assemblies since both types of membrane electrode assemblies can be mixed together and successfully co-processed. In act 504, the membrane electrode assemblies are brought to a cryo-temperature resulting in embrittling of the membrane electrode assemblies. Then the embrittled membrane electrode assemblies are pulverized and homogenized in accordance with method 200 or through the use of a high-capacity impact mill as described above.

In act 506, precious metals are leached from the pulverized membrane electrode assemblies by contacting a first acid solution with the pulverized membrane electrode assemblies for a sufficient period of time to form a first extract. The first acid solution contains a mineral acid and an oxidizing agent effective in oxidizing at least a portion of the precious metals present and solubilizing the oxidized precious metals as precious metal ion compounds. In one embodiment, the pulverized membrane electrode assemblies are leached by contact with the first acid solution from about 1 to about 10 minutes. In another embodiment, the pulverized membrane electrode assemblies are leached by contact with the first acid solution for a time from about 5 to about 20 minutes. In yet another embodiment, the pulverized membrane electrode assemblies are leached by contact with the first acid solution for a time from about 15 to about 60 minutes.

Mineral acids are inorganic acids. Examples of mineral acids include hydrochloric acid, nitric acid, sulfuric acid, phosphoric acid, and hypochloric acid. In one embodiment, one or more of the acid solutions include aqua regia. Examples of oxidizing agents in one or more of the acid solutions include hydrogen peroxide, nitric acid (especially when the acid is hydrochloric acid), chlorine, sodium chlorite, chlorite salts, and the like.

The pulverized membrane electrode assemblies and first acid solution may be optionally agitated during the time of contact. In another embodiment, the pulverized membrane electrode assemblies are not leached by contacting with the first acid solution for a set period of time. Rather, in act 507, the precious metal content of the first extract and/or the pulverized membrane electrode assemblies is monitored via a suitable analytical technique, and the leaching act 506 is terminated when the precious metal content monitored reaches a predetermined level.

The progress of leaching precious metal from the pulverized membrane electrode assemblies can be monitored in act 507 by taking a measurement of the amount of precious metal in the first extract and/or the residue (residue being the remaining portion of the mixture of pulverized membrane electrode assemblies and first acid solution after the extract is obtained) of the membrane electrode assemblies, which is still homogeneous, after and/or during contact with the first acid solution. The precious metal value of the whole amount of residue is calculated using routine mathematics once the precious metal value of a portion of the residue is known.

The percent yield can then be easily calculated by comparing the total amount of precious metals remaining in the residue with the total amount of precious metals in the first extract. A comparison of the precious metal content of the homogenized lot, the residue, and the first extract through mass balancing is a useful tool to evaluate the effectiveness of the pulverization process in homogenizing.

The first extract contains a significant portion of the precious metals present in the pulverized membrane electrode assemblies and represents a successful recovery of precious metals from the membrane electrode assemblies. In one embodiment, at least about 70% by weight of the precious metals originally present in the pulverized membrane electrode assemblies are contained in the extract. In another embodiment, at least about 90% by weight of the precious metals originally present in the pulverized membrane electrode assemblies are contained in the extract. In yet another embodiment, at least about 95% by weight of the precious metals originally present in the pulverized membrane electrode assemblies are contained in the extract.

In act 508, precious metals can be recovered from any of the precious metal-containing solutions or extracts by electroplating or chemical reduction techniques using methods known in the art.

The leaching act 506 can be repeated to obtain additional yield of precious metals. The residue remaining after completing act 506 can be contacted with any of a second acid solution, a third acid solution, and so forth (further acid solutions) as desired to obtain further extracts, which can be treated in the same manner as the first extract. Any acid solutions used to repeat leaching act 506 also contain a mineral acid and an oxidizing agent. In one embodiment, the first acid solution and any further acid solutions have the same composition. In another embodiment, the first acid solution and any further acid solutions have different compositions. In one embodiment, act 506 is repeated about 2 to about 4 times in addition to the first time act 506 is performed.

The first extract and any further extracts contain valuable materials worthy of recovery. One or more of the first and any further extracts may contain one or more of chloroplatinic acid, chloroplatinic salts, platinum, platinum salts, ruthenium, ruthenium salts, and the like. Further, valuable materials, such as ruthenium and polymer material from the polymer electrolyte membrane remain in the residue after leaching. These materials can be recovered in downstream processes.

The leaching of the pulverized membrane electrode assemblies in act 506 can be assisted by optional heating. In one embodiment, the leaching act 506 is performed at a temperature from about 15 to about 210° C. In other embodiment, the leaching act 506 is performed at a temperature from about 25 to about 110° C. In yet another embodiment, the leaching act 506 is performed at a temperature from about 50 to about 100° C. In one embodiment, one or more of the leaching act 506 is performed in a sealed PTFE container from about 50 to about 210° C. The heating for leaching act 506 may be provided by conductive means, convective means, or a microwave field.

By pulverizing the membrane electrode assemblies, a preliminary removal of the exterior layer, the gas diffusion layer, of the membrane electrode assemblies is no longer necessary. This eliminates either a manual separation of the membrane electrode assembly layers, which is highly labor intensive, or the use of solvents to delaminate, which emulsifies the electrode catalyst layers in catalyst coated membrane assemblies and is undesirable due to safety and environmental concerns. Both manual and solvent delaminating also involve a concomitant loss of some of the precious metal catalysts remaining on the gas diffusion layers or the polymer electrolyte membranes. However, the impact of the hydrophobic nature of the membrane electrode assemblies, a property imbued by the graphite nature of the carbon and the presence of PTFE, is magnified after pulverization due to increased surface area.

When the pulverized membrane electrode assemblies are contacted with acid, the pulverized membrane electrode assemblies tend to remain on the surface of the liquid. Therefore, increased recovery of precious metal can be achieved by keeping the pulverized membrane electrode assembly sample in contact with the leaching acid. Wetting of the pulverized membrane electrode assemblies can be facilitated by the use of surfactants and/or dispersants.

General examples of surfactants and/or dispersants include one or more of a nonionic surfactant, cationic surfactant, anionic surfactant, and amphoteric surfactant. Specific examples of surfactants include alkali metal salt of polymeric carboxylic acid surfactants and phosphate ester surfactants. These surfactants are known in the art, and many of these surfactants are described in McCutcheon's "Volume I: Emulsifiers and Detergents" and "Volume II: Functional Materials", 2001, North American Edition, published by McCutcheon's Division, The Manufacturing Confectioner Publishing Co., Glen Rock, N.J., which describe a number of surface-active agents and is hereby incorporated by reference for the disclosure in this regard. In one embodiment, the surfactants are one or more of Tamol® 731A, a diisobutylene/maleic acid anhydride co-polymer (Rohm and Haas, Philadelphia, Pa.), and Strodex® PK90, a phosphoric acid ester (Dexter Chemical, L.L.C, Bronx, N.Y.).

Figure 6:
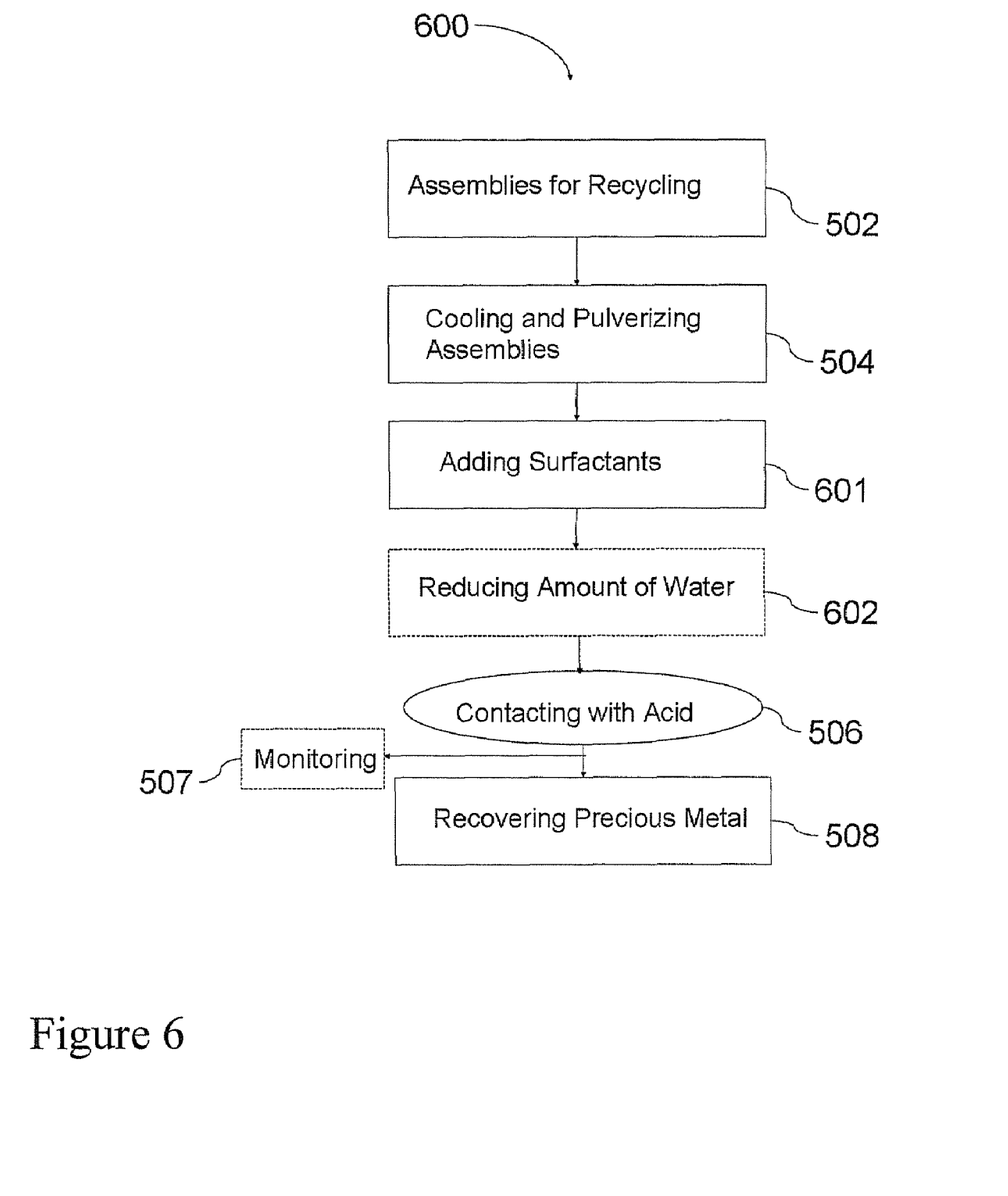
FIG. 6 illustrates a flow chart for leaching precious metal from membrane electrode assemblies in accordance with another aspect of the invention.

Referring to FIG. 6, a flow chart of a method 600 for recovery of precious metals from pulverized, homogenized membrane electrode assemblies using surfactants in accordance with aspects of the invention is shown. Like acts are analogous to acts described above in regard to method 500. Acts 502 and 504 are performed on a lot of membrane electrode assemblies in identical fashion to method 500. In act 601, one or more surfactants are added to the pulverized membrane electrode assemblies. In one embodiment, the pulverized membrane electrode assemblies are combined with an aqueous dispersion of one or more surfactants. In another embodiment, the pulverized membrane electrode assemblies are combined with a liquid containing hydrochloric acid and one or more surfactants. In yet another embodiment, one or more surfactants are added to the pulverized membrane electrode assemblies and a liquid containing water is subsequently added to the mixture of pulverized membrane electrode assemblies and surfactants. In a further embodiment, the pulverized membrane electrode assemblies are combined with an aqueous dispersion of one or more surfactants to form a paste and one or more of water and a water-based solution are added to the paste in order to disperse the paste as wetted solids.

In an optional act 602, the amount of water present in the mixture of pulverized membrane electrode assemblies and surfactants is reduced by adding concentrated HCl and evaporating the mixture of pulverized membrane electrode assemblies, surfactant and concentrated HCl. In another embodiment, the amount of water present in the mixture of pulverized membrane electrode assemblies and surfactants is reduced by placing the mixture of pulverized membrane electrode assemblies and surfactant in a column and passing concentrated HCl through the column.

After the addition of surfactants, the mixture of pulverized membrane electrode assemblies and surfactants is processed in the same manner as in acts 506 and 508 as in method 500 and optionally monitored according to act 507.

The methods described herein can be carried out in a batch fashion or in a continuous manner. For example, the methods described herein can be carried out in part by mixing the pulverized membrane electrode assemblies with detergent and other reagents as appropriate and placing a column, which can be heated. Water-based or acid-based solutions can be pumped through the column to either assist in packing the column or to dewater as necessary. The leaching acid can then be pumped through the column, and the effluent optionally measured for precious metal content; flow can be terminated when the precious metal content of the effluent drops below a predetermined level. The effluent can then be further processed in accordance with methods disclosed herein.

In another example, the methods described herein can be carried out in part by mixing the pulverized membrane electrode assemblies with detergent and other reagents as appropriate and placing into a heated reactor. After acid leaching and extraction acts are performed, the mixture is passed to a hollow fiber filtration apparatus. The portion of the mixture passing through the hollow fiber filtration apparatus can optionally be monitored for precious metal content and any portion not containing precious metals can be discarded. Wetted solids are returned to the reactor where they can be subjected to ignition and a later round of acid leaching in accordance with methods disclosed herein.

Figure 7:
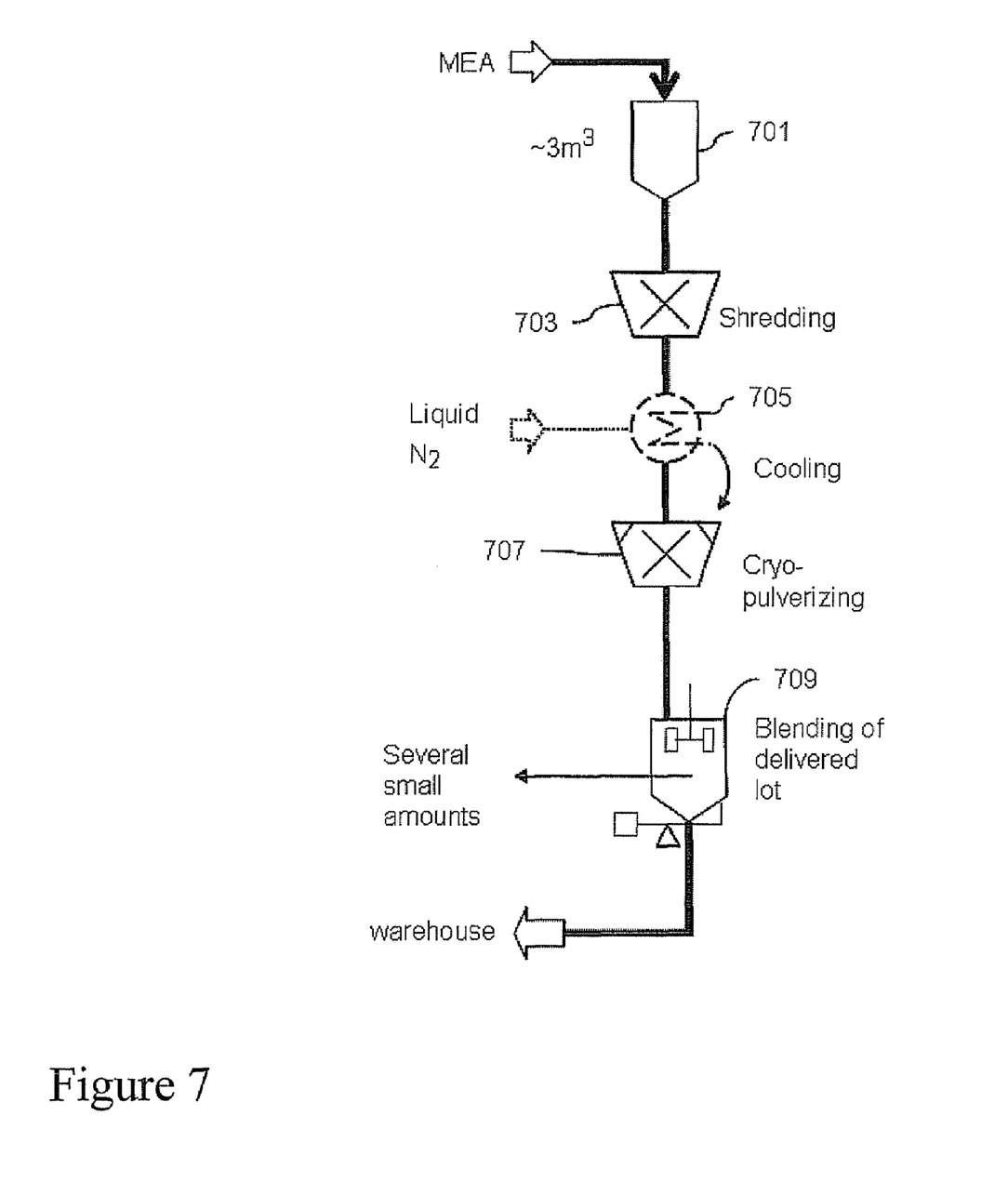
FIG. 7 displays an apparatus for pulverizing electrode membrane electrode assemblies in accordance with an aspect of the invention.

The process embodied in methods 500 and 600 can be implemented on a commercial scale. FIG. 7 illustrates an apparatus for large-scale pulverization of membrane electrode assemblies (labeled as MEA in FIG. 8) in accordance with method 200 with continuous grinding disclosed herein. Membrane electrode assemblies are introduced into a hopper 701. Pulverization can be assisted by passing the assemblies through a shredder 703 prior to being passed to a screw-feeder 705 that contacts the shredded membrane electrode assemblies with liquid nitrogen or another cryo-fluid. Finally, the shredded and cooled membrane electrode assemblies are passed to a high-capacity pulverizer 707 and a mixing tank 709, which promotes homogeneity of the lot. Small samples can be removed from the homogeneous lot and assayed for precious metal content in accordance with methods disclosed herein. The entire system can be designed such that gravity assists in the transfer of mass. The pulverized membrane electrode assemblies can be warehoused before further processing.

Figure 8:
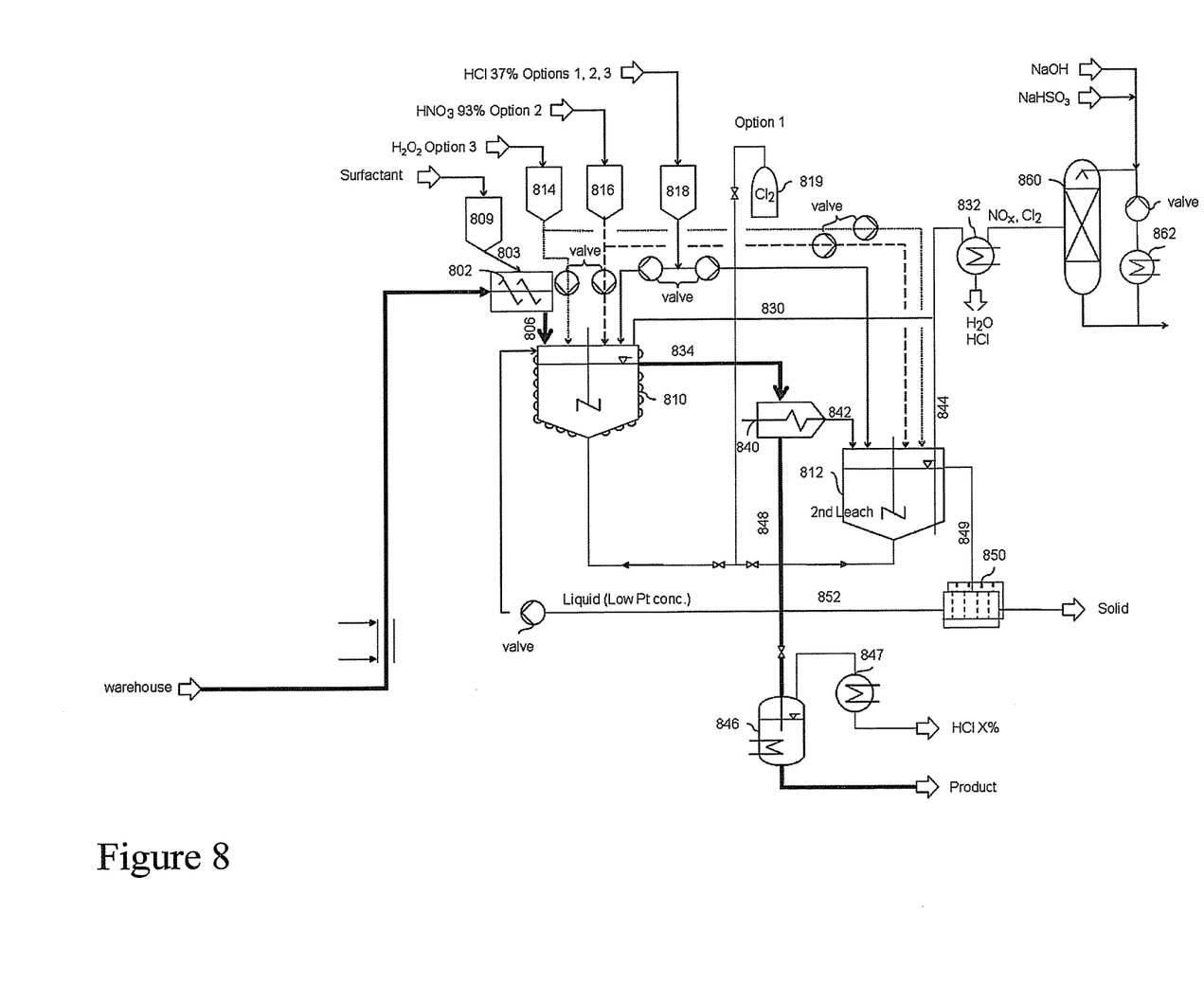
FIG. 8 displays a system for recycling precious metals from pulverized membrane electrode assemblies in accordance with an aspect of the invention.

FIG. 8 illustrates an automated system 800 for performing the recycling of precious metals exemplified in either or both methods 500 and 700. Pulverized membrane electrode assemblies are placed in a mixing tank 802. The addition of surfactants in accordance with act 601 of method 600 is optionally performed in mixing tank 802. Any addition of reagents discussed herein for acts 505 or 601 is added at this point in the appropriate sequence of addition. In one embodiment, a surfactant is added from a tank 809 via line 803 to form a blended mixture of surfactant and pulverized membrane electrode assemblies.

In one embodiment, pulverized membrane electrode assemblies are added to tank 802 at a continuous rate and the blended mixture is removed at a charging rate equal to the sum of the rate of addition of pulverized membrane electrode assemblies and the rate of reagent addition into mixing tank 802 and optionally other materials. In one embodiment, from about 25 about 250 kg per hour (0.25 m³ per hour) of pulverized membrane electrode assemblies mixed with aqueous surfactant is removed from mixing tank 802.

The system 800 has two leaching tanks, 810 and 812. The leaching tanks 810 and 812 are lined with glass or PTFE in a manner to be inert to corrosive acids and have means to heat the contents of the tanks, such as heating coils or microwave sources. Further all valves and lines used can be similarly resistant to corrosive acids. The mixture of pulverized assemblies and optional surfactants is pumped into leaching tank 810 via line 806 at the charging rate. Optionally, the mixture is pumped through an exchanger (not shown) that replaces water with concentrated HCl (about 37% HCl) or near concentrated HCl, such as at least about 25% HCl, before reaching the leaching tank 810. The leaching tank 810 has a volume such that the pulverized membrane electrode assemblies have a sufficient average residence time in extraction tank 810 in accordance with act 506 disclosed herein.

Reagents useful for leaching of precious metals in accordance with the methods disclosed herein are stored in reagents tanks 814, 816, 818, and 819. Useful reagents include concentrated HCl, nitric acid, hydrogen peroxide, chlorine gas and near concentrated reagents. Reagents in accordance with act 506 disclosed herein are added from the reagent tanks to leaching tank 810 at a second rate. In order to maintain a constant volume in leaching tank 810, material is removed from the leaching tank 810 at a third rate equal to the sum of rates for all materials added to leaching tank 810. The magnitude of the third rate and charging rate in addition to the total volume of leaching tank 810 is determinative of the average amount of time pulverized membrane electrode assembly particles remain in leaching tank 810; therefore, the values of the third rate, charging rate, and the total volume of leaching tank 810 are carefully selected. In one embodiment, the third rate is from about 1 to about 25 m³/hr.

The leaching tank 810 is heated to a desired temperature such as from about 25° C. to about 210° C. Upon heating, leaching tank 810 can be permitted to pressurize to above ambient pressure due to vapor from the added reagents. Optionally, the extraction tank 810 can be pressurized by a gas supplied by an external tank. In one embodiment, the extraction tank 810 is pressurized from about 1.1 to about 10 atm.

Fumes released from the reagents and/or the leaching process are transported by line 830 to treatment unit 832 and handled/exhausted/treated according to known procedures depending on the content on the fumes. Vapor products from the treatment unit 832 are passed to a scrubber 860. Optionally, vapor products from the scrubber 860 are passed to a second treatment unit 862 and then back to the scrubber 860.

Material is transferred from the extraction tank 810 to a solid/liquid separator and/or decanter unit 840 at the third rate. The solid/liquid separator 840 separates the material from leaching tank 810 into a first extract and solid residue. The solid residue from the first leaching tank 810 is transferred to the second leaching tank 812 via line 842. The first extract containing leached precious metals is transferred to a recovery unit 846 via line 848. The recovery unit 846 can perform one or more of removing acidity and reducing precious metal ions to elemental metal. Vapor emitted from recovery unit 846 is treated by a treatment unit 847 in a similar manner of operation as treatment unit 832.

A second leaching takes place in tank 812 in a similar manner to tank 810. Reagents useful for the leaching in accordance with the methods disclosed herein are stored in reagents tanks 814, 816, 818, and 819. Solid material from solid/liquid separator 840 is transferred to tank 812 via line 834 at a fourth rate, and reagents in accordance with act 506 disclosed herein are added to leaching tank 812 at a fifth rate. In order to maintain a constant volume in leaching tank 812, material is removed from the leaching tank 812 at a sixth rate equal to the sum of the fourth and fifth rates. The magnitudes of the fourth and fifth rates in addition to the total volume of leaching tank 812 are determinative of the average amount of time pulverized membrane electrode assembly particles will remain in leaching tank 812. Therefore, the values of the fourth rate, fifth rate, and the total volume of leaching tank 812 are carefully selected. Leaching tank 812 also has means to heat and to pressurize with gas in the same manner as leaching tank 810. Gases are vented to treatment unit 832 via line 844 in the same manner as for leaching tank 810.

Material from leaching tank 812 is transferred to a second solid/liquid separator and/or filter press 850 via line 849 at the sixth rate. Solid residue leaves the separator 850 and is discarded as waste or processed downstream to recover additional materials including polymer components and ruthenium. Extract from the second leaching tank 812 leaves solid/liquid separator 850 via line 852 and is returned to the first leaching tank 810; the extract from the second tank 812 is transferred from solid/liquid separator 850 to leaching tank 810 at a seventh rate. In one embodiment, the seventh rate is from about 1 to about 25 m$^3$/hr. The extract from the second leaching tank 812 is relatively low in precious metal content; therefore, recovery of precious metal directly from the second extract may not be economical. Transferring the second extract to the beginning of the leaching process, leaching tank 810, allows for the precious metal in the second extract to be recovered.

Proper control of the rate of material transfer through system 800 is an element for successful implementation of the methods disclosed herein. The apparatus 800 is controlled by a controller and processor that can control the various valves (as labeled in FIG. 8) and pumps, which may be used to transfer materials, to ensure transfer rates are in a proper range. Further, the precious metal content of the solid and liquid material exiting tanks 810 and/or 812 can be periodically monitored using techniques disclosed herein. The various transfer rates can be adjusted to increase or decrease the average residence time of the pulverized membrane electrode assembly material in leaching tanks 810 and 812 as necessary based on the efficiency of precious metal leaching.

The third rate for material exiting leaching tank 810 is approximately equal to the rates of material entering leaching tank 810. That is, the third rate is approximately equal to the sum of the charging rate (material leaving mixing tank 802), the second rate (reagents added), and the seventh rate (extract returned to leaching tank 810 from solid/liquid separator 850). The charging rate, second rate, and seventh rate can be arbitrarily changed by the controller with limitations that pulverized electrode membrane assembly materials remain in leaching tank 810 for a sufficient average residence time, the apparatus has a satisfactory rate of throughput, and an appropriate ratio of reagents to pulverized membrane electrode assembly materials in maintained in leaching tank 810. In one embodiment, the mixture in leaching tank 810 is from about 2 to about 40% solids. In another embodiment, the mixture in leaching tank 810 is from about 5 to about 25% solids. The extract from leaching tank 812 being added into leaching tank 810 via line 852 can be temporarily stored (not shown) or discarded (not shown) if required in order to control the seventh rate.

Similarly, the sixth rate for material exiting leaching tank 812 is approximately equal to the rates of material entering tank 812. That is, the sixth rate is approximately equal to the sum of the fourth (solid residue entering tank 812) and the fifth rate (reagents entering tank 812). The rates can be adjusted provided that the solid residue remains for a sufficient average resonance time in leaching tank 812, the apparatus has a satisfactory rate of throughput, and an appropriate ratio of liquid to solid materials in maintained in leaching tank 810. In one embodiment, the mixture in leaching tank 812 is from about 1 to about 40% solids. In another embodiment, the mixture in leaching tank 812 is from about 5 to about 25% solids.

The third rate is correlated to the fourth rate depending upon the ratio of liquid to solid materials in the first leaching tank 810. However, the sixth rate for discharge from second leaching tank 812 can have a wide range of value since the discharge from tank 812 can be stored temporarily or discarded entirely if necessary. Any loss of extract contributing to the seventh rate can be compensated by additional reagent being added to leaching tank 810; however, directing as much extract as possible into line 852 increases the yield of precious metals obtained. The controller can be programmed to calculate the magnitude of the various rates to maximize precious metal recovery while maintaining sufficient throughput and proper volume in leaching tanks 810 and 812.

The following examples illustrate the subject invention. Unless otherwise indicated in the following examples and elsewhere in the specification and claims, all parts and percentages are by weight, all temperatures are in degrees Centigrade, and pressure is at or near atmospheric pressure.

EXAMPLE 1

10 g of catalyst coated membrane assemblies or gas diffusion electrode assemblies were pulverized according to method 200 using a batch-wise pulverization and placed on a roller for one hour for blending. 0.5 g of each pulverized membrane electrode assembly material was processed in duplicate in order to assess reproducibility. Each 0.5 g sample was leached using either aqua regia or concentrated HCl with hydrogen peroxide as a leaching acid by contact in either a sealed PTFE bottle and heating at 200° C. in a microwave field for 30 minutes or in a glass beaker and heating at 100° C. for 20 minutes. The first extract obtained was then filtered, the filtrate evaporated to remove nitrates, and then reconstituted in concentrated HCl. The residue remaining in the filter after the filtration act was ignited at 500° C. under air, then the ashes were contacted with a leaching acid in the same manner as the first leaching act. The extract from the residue was then evaporated and reconstituted in concentrated HCl to form a second fraction. Both fractions were tested for platinum content where the precious metal content of the residue was used for mass balance calculations; other precious metals were not assayed for. The relative standard deviations (RSD) for runs using catalyst coated membrane assembly materials and gas diffusion electrode assembly materials were 0.2% and 0.6%, respectively. The yield of platinum recovered from the first extraction of pulverized membrane electrode assemblies for each heating method and acid used is summarized in Table 1.

TABLE 1

| Sample | Heating Method | Acid Used | 1st Pt Yield, % |
|---|---|---|---|
| CCM | Beaker | Aqua regia | 72 |
| CCM | Microwave | HCl/H$_2$O$_2$ | 92 |
| GDE | Beaker | Aqua regia | 93 |
| GDE | Microwave | HCl/H$_2$O$_2$ | 97 |

Table 1 shows that satisfactory yields can be obtained using microwave heating. However, heating of a PTFE vessel in a microwave field can result in damage to the walls of the vessel because of carbon sticking to the walls of the PTFE vessel. Carbon is an absorber of microwaves and the carbon on the walls of the vessel overheats the PTFE.

EXAMPLE 2

0.5 g of a 30% (w/w) aqueous dispersion of Tamol® 731A was added to 0.5 g of pulverized catalyst coated membrane assemblies to form a paste having 15% (w/w) of Tamol® 731A. Then water was added. The paste dispersed, and the solids wetted and stayed dispersed, although the particles had some degree of granulation. Concentrated HCl was added and the mixture was evaporated until 5 mL remained; the dispersion was stable with the addition of concentrated HCl. Aqua regia was then added, and the normal procedure of leaching, for precious metal recovery, and igniting the residue, to calculate mass balance, according to Example 1 was performed using aqua regia as a leaching acid and heating in a glass beaker at 100° C.

EXAMPLE 3

0.5 g of a 30% (w/w) aqueous dispersion of Tamol® 731A was added to 0.5 g of pulverized catalyst coated membrane assemblies to form a paste having 15% (w/w) of Tamol® 731A. Concentrated HCl was added to the mixture, and the paste coagulated into tar like clumps. Aqua regia was then added, and the normal procedure of leaching, for precious metal recovery, and igniting the residue, to calculate mass balance, according to Example 1 was performed using aqua regia as a leaching acid and heating in a beaker at 100° C.

EXAMPLE 4

Tamol® 731A was added to concentrated HCl to form a 1.5% (w/w) mixture of surfactant and concentrated HCl. Tamol® 731A flocculated when added to the concentrated HCl. The mixture of 1.5% (w/w) surfactant/concentrated HCl was then added to 0.5 g of pulverized gas diffusion electrode assemblies. The pulverized membrane electrode assemblies dispersed poorly after being added to the acidified surfactant. Aqua regia was then added, and the normal procedure of leaching, for precious metal recovery, and igniting the residue, to calculate mass balance, according to Example 1 was performed using aqua regia as a leaching acid and heating in a glass beaker at 100° C.

EXAMPLE 5

0.5 g of Tamol 731A® was mixed into 0.5 g of pulverized catalyst coated membrane assemblies or gas diffusion electrode assemblies to form a 15% (w/w) mixture. 10 mL of water was then added. The powder wetted well and granulated, and the mixture was then partially evaporated. Aqua regia was then added and the normal procedure of leaching, for precious metal recovery, and igniting the residue, to calculate mass balance, according to Example 1 was performed using aqua regia as a leaching acid and heating in a glass beaker at 100° C.

The yield recovered from Examples 2-5 is summarized in Table 2.

TABLE 2

| Sample | Example | Order of Addition | 1st Pt Yield, % |
|---|---|---|---|
| CCM | Ex. 2 | Surfactant and membrane electrode assembly/H$_2$O/HCl/aqua regia | 94 |
| CCM | Ex. 3 | Surfactant and membrane electrode assembly/HCl/aqua regia | 70 |
| CCM | Ex. 5 | Surfactant and membrane electrode assembly/H$_2$O/aqua regia | 84 |
| GDE | Ex. 3 | Surfactant and membrane electrode assembly/HCl/aqua regia | 94 |
| GDE | Ex. 4 | Surfactant and HCl/membrane electrode assembly/aqua regia | 96 |
| GDE | Ex. 5 | Surfactant and membrane electrode assembly/H$_2$O/aqua regia | 97 |

The data presented in Table 2 show that order of addition of reagents is crucial to obtaining high platinum yields, particularly when using catalyst coated membrane assemblies. The use of surfactant is also positive for the longevity of the PTFE vessels when sealed vessel extraction is used. Besides increasing the wettability of the pulverized membrane electrode assemblies, the impact of carbon adhering to the wall of a PTFE vessel is mitigated since the wetted pulverized membrane electrode assemblies remain dispersed in the liquid phase, thereby reducing overheating of the vessel walls.

With respect to any figure or numerical range for a given characteristic, a figure or a parameter from one range may be combined with another figure or a parameter from a different range for the same characteristic to generate a numerical range.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of recovering precious metal from fuel cells comprising:
    cooling membrane electrode assemblies to a temperature of about −75° C. or less to embrittle the membrane electrode assemblies;
    pulverizing the embrittled membrane electrode assemblies;
    adding an aqueous dispersion comprising one or more surfactants to the pulverized membrane electrode assemblies to form a paste;
    adding a solution comprising water in order to disperse the paste as wetted solids;
    contacting the pulverized membrane electrode assemblies in the paste with an acid solution comprising a mineral acid and an oxidizing agent to form an extract and a residue; and
    recovering precious metal from the extract.

2. The method of claim 1 wherein the mineral acid comprises one or more selected from the group of hydrochloric acid, nitric acid, sulfuric acid, phosphoric acid, and hypochloric acid.

3. The method of claim 1 wherein the oxidizing agent comprises one or more selected from the group of nitric acid, hydrogen peroxide, chlorine gas, sodium chlorite, and chlorite salts.

4. The method of claim 1 wherein the membrane electrode assemblies comprise one or more selected from the group of catalyst coated membrane assemblies and gas diffusion electrode assemblies.

5. The method of claim 1 wherein the acid solution comprises one or more selected from the group of aqua regia and a mixture of hydrochloric acid and hydrogen peroxide.

6. The method of claim 1 wherein the extract comprises one or more selected from the group of platinum, platinum salts, chloroplatinic acid, chloroplatinic salts, ruthenium, and ruthenium salts.

7. The method of claim 1, comprising cooling membrane electrode assemblies to a temperature of about −125° C. or less.

8. The method of claim 1, wherein the pulverized membrane electrode assemblies have a density from about 25 to about 2500 kg m$^{-3}$ and the pulverized membrane electrode assemblies have an average particle size of about 250 microns or less.

9. The method of claim 1, wherein at least about 70% by weight of precious metal is recovered from the fuel cells.

10. A method of recovering precious metal from fuel cells comprising:
    cooling membrane electrode assemblies to a temperature of about −75° C. or less to embrittle the membrane electrode assemblies;
    pulverizing the embrittled membrane electrode assemblies;
    adding an aqueous dispersion comprising a surfactant comprising one or more selected from the group of alkali metal polymeric carboxylic acid surfactants and phosphoric acid ester surfactants to the pulverized membrane electrode assemblies to form a paste;
    contacting the pulverized membrane electrode assemblies in the paste with an acid solution comprising a mineral acid and an oxidizing agent to form an extract and a residue; and
    recovering precious metal from the extract.

11. The method of claim 10 wherein the mineral acid comprises one or more selected from the group of hydrochloric acid, nitric acid, sulfuric acid, phosphoric acid, and hypochloric acid.

12. The method of claim 10 wherein the oxidizing agent comprises one or more selected from the group of nitric acid, hydrogen peroxide, chlorine gas, sodium chlorite, and chlorite salts.

13. The method of claim 10 wherein the membrane electrode assemblies comprise one or more selected from the group of catalyst coated membrane assemblies and gas diffusion electrode assemblies.

14. The method of claim 10 wherein the acid solution comprises one or more selected from the group of aqua regia and a mixture of hydrochloric acid and hydrogen peroxide.

15. The method of claim 10 wherein the extract comprises one or more selected from the group of platinum, platinum salts, chloroplatinic acid, chloroplatinic salts, ruthenium, and ruthenium salts.

16. The method of claim 10, comprising cooling membrane electrode assemblies to a temperature of about −125° C. or less.

17. The method of claim 10, wherein the pulverized membrane electrode assemblies have a density from about 25 to about 2500 kg m$^{-3}$ and the pulverized membrane electrode assemblies have an average particle size of about 250 microns or less.

18. The method of claim 10, wherein at least about 70% by weight of precious metal is recovered from the fuel cells.

19. A method of recovering precious metal from fuel cells comprising:
    cooling membrane electrode assemblies to a temperature of about −75° C. or less to embrittle the membrane electrode assemblies;
    pulverizing the embrittled membrane electrode assemblies;
    contacting the pulverized membrane electrode assemblies with an acid solution comprising a mineral acid and an oxidizing agent to form an extract and a residue;
    contacting the residue with a further acid solution comprising a mineral acid and an oxidizing agent to leach precious metals and form a second extract;
    monitoring the amount of precious metals in one or more of the extract and the second extract;
    optionally terminating the leaching of one or more of the pulverized membrane electrode assemblies and the residue when the monitored amounts of precious metals reaches a predetermined amount; and
    recovering precious metal from the extract.

20. The method of claim 19 wherein the membrane electrode assemblies comprise one or more selected from the group of catalyst coated membrane assemblies and gas diffusion electrode assemblies.

21. The method of claim 19 wherein the acid solution comprises one or more selected from the group of aqua regia and a mixture of hydrochloric acid and hydrogen peroxide.

22. The method of claim 19 wherein the extract comprises one or more selected from the group of platinum, platinum salts, chloroplatinic acid, chloroplatinic salts, ruthenium, and ruthenium salts.

23. The method of claim 19 comprising cooling membrane electrode assemblies to a temperature of about ±125° C. or less.

24. The method of claim 19 wherein the pulverized membrane electrode assemblies have a density from about 25 to about 2500 kg m$^{-3}$ and the pulverized membrane electrode assemblies have an average particle size of about 250 microns or less.

25. The method of claim 19 wherein at least about 70% by weight of precious metal is recovered from the fuel cells.

26. The method of claim 19 wherein the mineral acid comprises one or more selected from the group of hydrochloric acid, nitric acid, sulfuric acid, phosphoric acid, and hypochloric acid.

27. The method of claim 19 wherein the oxidizing agent comprises one or more selected from the group of nitric acid, hydrogen peroxide, chlorine gas, sodium chlorite, and chlorite salts.

* * * * *